United States Patent [19]
Silvis et al.

[11] Patent Number: 4,968,756
[45] Date of Patent: Nov. 6, 1990

[54] BLENDS OF CARBONATE POLYMER POLYACETAL AND COMPATIBILIZER

[75] Inventors: H. Craig Silvis; Bruce A. King; Vinod K. Berry; John R. Schroeder, all of Midland, Mich.

[73] Assignee: The Dow Chemical Company, Midland, Mich.

[21] Appl. No.: 402,572

[22] Filed: Sep. 5, 1989

[51] Int. Cl.$^5$ ............................................. C08L 69/00
[52] U.S. Cl. .................................... 525/399; 525/456; 525/465; 525/467
[58] Field of Search ................ 525/399, 456, 465, 467

[56] References Cited

U.S. PATENT DOCUMENTS

| | | | |
|---|---|---|---|
| 3,431,224 | 3/1969 | Goldblum | 260/13 |
| 3,646,159 | 2/1972 | Miller | 260/860 |
| 4,179,479 | 12/1979 | Carter, Jr. | 525/123 |
| 4,707,525 | 11/1987 | LaNieve, III | 525/399 |
| 4,743,650 | 5/1988 | Boutni | 525/92 |

FOREIGN PATENT DOCUMENTS 56-082294 7/1981 Japan.

Primary Examiner—John C. Bleutge
Assistant Examiner—David Buttner

[57] ABSTRACT

An improved resinous blend having good impact properties and solvent resistance comprising an aromatic carbonate polymer, a polyacetal and a thermoplastic polyurethane.

4 Claims, No Drawings

BLENDS OF CARBONATE POLYMER POLYACETAL AND COMPATIBILIZER

BACKGROUND OF THE INVENTION

The present invention relates to a thermoplastic resin composition and more particularly with carbonate polymer resin mixtures having good solvent resistance, stress and crack resistance and greater compatibility of the components thereof. In U.S. Pat. No. 3,646,159 a blend of an aromatic polycarbonate and a polyacetal is disclosed. The presence of the polyacetal provides a polymer blend having improved environmental stress crazing and cracking characteristics. Disadvantageously however, such blends of a carbonate polymer resin and a polyacetal although demonstrating good solvent resistance and environmental stress cracking and crazing resistance have relatively poor impact strengths. This is due to the fact that the two components of such polymer blends are not sufficiently compatible and the presence of regions within the polymer blend of varying degrees of compatibility results in overall reduction of impact and strength properties thereof.

It would be desirable if there were provided a blend comprising a carbonate polymer and a polyacetal which retains the good solvent resistant properties of the binary blend but having improved impact strength.

SUMMARY OF THE INVENTION

According to the present invention there is provided a thermoplastic resinous blend comprising on a weight basis 50 to 97, preferably 60 to 94 percent aromatic carbonate polymer; 2 to 25, preferably 5 to 20 percent polyacetal; and 0.5 to 40 percent thermoplastic polyurethane.

Due to the presence of the thermoplastic polyurethane, which acts as a compatibilizer, the normal incompatibility between the carbonate polymer resin and the polyacetal is reduced or eliminated and the resulting blend demonstrates significantly improved impact resistant properties.

DETAILED DESCRIPTION

Aromatic carbonate polymers are well known resins or may be prepared by well known techniques. The aromatic carbonate polymers may be prepared by reacting a dihydric phenol and optionally a diacid with a carbonate precursor such as phosgene, a haloformate or a carbonate ester. Generally speaking, such carbonate polymers may be typified as possessing recurring structural units of the formula

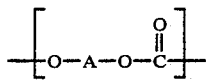

where A is a divalent aromatic radical of the dihydric phenol employed in the polymer producing reaction or the remnant of the diacid. The dihydric phenols which may be employed to provide such aromatic carbonate polymers are mononuclear or polynuclear aromatic compounds, containing as functional groups, 2 or more hydroxyl radicals, each of which is attached directly to a carbon atom of an aromatic nucleus. Typical dihydric phenols are 2,2-bis-(4-hydroxyphenyl)-propane; hydroquinone; resorcinol; 2,2-bis-(4-hydroxyphenyl)-pentane; 2,4′-dihydroxy diphenyl methane; bis-(2-hydroxyphenyl) methane: bis-(4-hydroxyphenyl)-methane: bis(4-hydroxy-5-nitrophenyl)-methane; 1,1-bis-(4-hydroxyphenyl)-ethane; 3,3-bis-(4-hydroxyphenyl)-pentane; 2,2′-dihydroxydiphenyl; 2,6-dihydroxy naphthalene; bis-(4-hydroxypehnyl) sulfone; 2,4′dihydroxydiphenyl sulfone; 5′-chloro-2,4′-dihydroxydiphenyl sulfone; bis-(4-hydroxyphenyl) diphenyl disulfone; 4,4′-dihydroxydiphenyl ether; 4,4′-dihydroxy-3,3′-dichloro diphenyl ether; and 4,4′-dihydroxy-2,5-diethoxydiphenyl ether.

It is, of course, possible to employ two or more different dihydric phenols or a dihydric phenol in combination with a glycol, a hydroxy terminated polyester, or a dibasic acid in the event a carbonate copolymer rather than a homopolymer is desired for use in the preparation of the carbonate polymer mixtures of the invention. Also mixtures of various carbonate polymers (including mixtures with polyester) may be employed.

When a carbonate ester is used as the carbonate precursor in the polymer forming reaction, the materials are reacted at temperatures of from 100° C. or higher for times varying from 1 to 15 hours. Under such conditions ester interchange occurs between the carbonate ester and the dihydric phenol used. The ester interchange is advantageously consummated at reduced pressures of the order of from about 10 to about 100 mm of mercury. A preferred carbonate polymer is bisphenol A polycarbonate.

Any suitable polyacetal may be used in preparing the blend of this invention. Preferably, polyacetals having a melt viscosity characteristic of 5,000 to 50,000 poise may be used to blend with the thermoplastic polycarbonate polymers described herein. One class of polyacetal commonly referred to as polyoxymethylene is preferred, although other materials designated as polyacetals, e.g., trioxane, may also be used. Polyoxymethylenes are prepared generally by two techniques; the first is the polymerization of anhydrous monomeric formaldehyde, accomplished under various reaction conditions and in the presence of various catalysts well known in the art. Suitable catalysts for the polymerization of formaldehyde include primary, secondary and tertiary aliphatic amines, cycloaliphatic amines, primary aromatic amines, arsines, phosphines, morpholines, hydrazines, substituted hydrazines, substituted morpholines, piperidines, metal hydrocarbons, carbodiimides, redox catalysts, and the like. Polyoxymethylenes can also be prepared by the polymerization of trioxane, generally in the presence of a suitable catalyst. Some such suitable catalysts for the polymerization of trioxane include antimony trifluoride, antimony fluorborate, bismuth trifluoride, bismuth oxyfluoride, alkane sulfonic acids, thioanyl chloride, phosphorous trichloride, stannic chloride, titanium tetrachloride, zirconium chloride and the like.

The polyoxymethylene polyacetals can be prepared either in the solvent phase or in the vapor phase. For example, the particular material to be polymerized may be dissolved in a suitable solvent or the material, that is, trioxane, for example, may be reacted in a vapor phase. In addition to pure polyoxymethylenes, trioxane and/or formaldehyde can be polymerized to form copolymerized polyoxymethylenes by conducting the reaction in the presence of a comonomer such as, for example, 2-chloromethyl oxyethylene, cyclic ethers, alkylene carbonates such as, for example, ethylene carbonate, propylene carbonate and the like. Due to the rapid degradation of polyoxymethylenes, it is generally desirable to stabilize the end group by reaction with a suitable end blocking agent such as, for example, hydrazine, substituted hydrazine, urea, thiourea, substituted urea and thioureas, aromatic amines, phenols, N,N,N',N'-tetra(hydroxyalkyl)alkylene diamine, carboxylic acids, carboxylic acid anhydrides, carboxylic acid esters, organic monoisocyanates and the like.

In addition to polyoxymethylenes, polyacetals formed by the reaction of aldehydes with glycols may be used. Any suitable aldehyde may be used such as, for example, formaldehyde, acetaldehyde, propionaldehyde, butyraldehyde, isobutyraldehyde, benzaldehyde, cinnamaldehyde, acrolein, crotonaldehyde, beta-ethylalpha-methyl acrolein, alpha methyl acrolein and the like. Any suitable glycol may be used in the preparation of the polyacetal such as, for example, the polyalkylene ether glycols and the dihydric alcohols mentioned in U.S. Pat. No. 3,201,372.

It has been found that any polyacetal having the melt viscosity characteristics set forth herein can be used in combination with the polycarbonates of this invention to achieve a solvent resistant composition. Although it is clear that any suitable polyacetal may be used as described herein, it is generally preferred that those acetals which are employed contain the acetal oxygen grouping as part of the polymeric backbone as opposed to polyvinyl acetals and other polymeric products wherein the acetal group is pendant or secondary to the main polymeric chain.

The thermoplastic polyurethanes useful in the present invention are the condensation products of a diisocyanate and one or more dihydroxy compounds. Examples of suitable dihydroxy compounds include dihydroxy terminated polyethers or polyesters, alkylene glycols, and polyalkylene glycols. Examples of suitable materials are the condensation products of diisocyanates such as 2,4-tolylene diisocyanate, 1,5-naphthalene diisocyanate, 2,7-fluorene diisocyanate, and methylene di-paraphenylene diisocyanate, (MDI) with a polyester such as, for example, polyethylene succinate or polyethylene adipate, and a glycol such as ethylene glycol or 1,4-butane diol.

A preferred thermoplastic polyurethane has hard segments and soft segments and is the reaction product of MDI with butane diol and polyethylene adipate having a molecular weight of 1000 to 2000.

The thermoplastic resin blend of the present invention may be prepared by combining the respective components in the form of their respective solid particles and melt blending the same according to known techniques. The components may be combined in any order and two of the components may be preblended prior to addition of the third component if desired.

The resin blend is usefully employed in the preparation of injection molded articles useful as components of automobiles, appliances, electrical machinery, etc. Additives and adjuvants well known in the art such as colorants, pigments, antimicrobial agents, stabilizers, impact modifiers, foaming agents, ultraviolet light stabilizers, lubricants, plasticizers, etc. may be incorporated in the resin blend if desired.

Having described the invention the following examples are provided to further illustrate the same and are not to be construed as limiting. Unless stated to the contrary all parts and percentages are based on weight.

EXAMPLE 1

A polyoxymethylene polyacetal polymer (Celcon ® M25 available from Hoechst Celanese Corporation) 70 parts and a thermoplastic polyurethane (Pellethane ® 2355-75A, available from The Dow Chemical Company) 30 parts were melt blended using a Welding Engineer's twin screw extruder at an average zone temperature of 200° C. and a screw speed of 250 rpm. The extrudate was cooled in a water bath, chopped into pellets and dried. The resulting particles were further melt blended with polycarbonate (Calibre ® 300-22, available from The Dow Chemical Company) 300 parts. The extruder employed for preparing the finished blend was the same extruder as previously employed operating at an average zone temperature of 220° C. The resulting extrudate was cooled, chopped and dried, and utilized to prepare test bars by injection molding for physical property evaluation. The resulting test bars are labeled as Run A.

Additional resin blends are prepared utilizing reduced amounts of polycarbonate resin. In Run B 200 parts polycarbonate to 100 parts of polyacetal/polyurethane blend are employed. In Run C 100 parts polycarbonate to 100 parts of polyacetal/polyurethane blend are employed. Results of physical property testing are contained in Table I.

TABLE I

|  | Run A | Run B | Run C |
|---|---|---|---|
| Polycarbonate % | 75 | 67 | 50 |
| Yield Stress kg/m$^2$ × 10$^3$ | 54.6 | 51.7 | 45.1 |
| (psi) | (7770) | (7350) | (6420) |
| Yield Strain % | 4.4 | 4.7 | 5.7 |
| Ult. Stress kg/m$^2$ × 10$^3$ | 50.1 | 57.5 | 53.8 |
| (psi) | (7130) | (8180) | (7650) |
| Ult. Strain % | 51.0 | 81.8 | 93.7 |
| Modulus kg/m$^2$ × 10$^6$ | 2.5 | 2.3 | 2.0 |
| (psi × 10$^6$) | (3.5) | (3.3) | (2.9) |
| Impact-Notched Izod* (ft · lb/in) | 8.51 | 13.2 | 19.3 |

*ASTM D-256

In addition the above compositions were tested for solvent resistance and found to provide significantly improved resistance to the effects of various common solvents compared to polycarbonate alone.

What is claimed is:

1. A thermoplastic resinous blend comprising on a weight basis 50 to 97 percent aromatic carbonate polymer: 2 to 25 percent polyoxymethylene polyacetal; and 0.5 to 40 percent thermoplastic polyurethane.

2. A blend according to claim 1 comprising 60 to 94 percent aromatic carbonate polymer; 5 to 20 percent polyacetal; and 1 to 20 percent thermoplastic polyurethane.

3. A blend according to claim 1 wherein the polycarbonate is a bisphenol A polycarbonate.

4. A blend according to claim 1 wherein the thermoplastic polyurethane comprises in polymerized form methylene di-paraphenylene diisocyanate.

* * * * *